United States Patent
Duval et al.

(10) Patent No.: US 9,503,785 B2
(45) Date of Patent: Nov. 22, 2016

(54) ANTI-SPLITTER VIOLATION CONDITIONAL KEY CHANGE

(75) Inventors: Gregory Duval, Highlands Ranch, CO (US); Michael Busch, Highlands Ranch, CO (US)

(73) Assignee: NAGRASTAR, LLC, Englewood, CO (US)

( * ) Notice: Subject to any disclaimer, the term of this patent is extended or adjusted under 35 U.S.C. 154(b) by 0 days.

(21) Appl. No.: 13/166,508

(22) Filed: Jun. 22, 2011

(65) Prior Publication Data

US 2012/0328099 A1    Dec. 27, 2012

(51) Int. Cl.
| H04N 7/167 | (2011.01) |
| H04N 21/442 | (2011.01) |
| H04N 21/418 | (2011.01) |
| H04N 21/2389 | (2011.01) |
| H04N 21/266 | (2011.01) |
| H04N 21/4385 | (2011.01) |
| H04N 21/4623 | (2011.01) |
| H04N 21/835 | (2011.01) |

(52) U.S. Cl.
CPC .. *H04N 21/44236* (2013.01); *H04N 21/23895* (2013.01); *H04N 21/26606* (2013.01); *H04N 21/4181* (2013.01); *H04N 21/43853* (2013.01); *H04N 21/4623* (2013.01); *H04N 21/835* (2013.01)

(58) Field of Classification Search
CPC ........... H04N 21/40; H04N 21/26606; H04N 60/14; H04N 21/4623
USPC ........................................................ 380/239
See application file for complete search history.

(56) References Cited

U.S. PATENT DOCUMENTS

| 5,461,675 A | 10/1995 | Diehl et al. |
| 6,633,644 B2 | 10/2003 | Van Rijnsoever et al. |
| 6,725,459 B2 | 4/2004 | Bacon |
| 6,925,183 B2 | 8/2005 | Jiang et al. |

(Continued)

FOREIGN PATENT DOCUMENTS

| EP | 1447976 | 8/2004 |
| EP | 1742474 | 1/2007 |

(Continued)

OTHER PUBLICATIONS

PCT International Search Report and Written Opinion mailed Apr. 12, 2012, in Application PCT/US2011/042182, 9 pages.

(Continued)

*Primary Examiner* — Esther B Henderson

(57) ABSTRACT

Systems and methods are disclosed for performing anti-piracy countermeasures in order to prevent unauthorized access of protected content. A conditional access system may be modified to include a counter. The counter is incremented every time the conditional access system receives a request that is a potential indication of pirate activity. The counter may also be decremented every time the conditional access system receives a request indicative of legitimate activity. If the conditional access system receives a management message containing a key required to access content keys, the conditional access system checks the counter. If the counter is below a threshold value, the conditional access system obtains the key. However, if the counter is above the threshold value, the conditional access system disregards the key contained in the management message, thereby losing access to protected content.

18 Claims, 7 Drawing Sheets

(56) References Cited

U.S. PATENT DOCUMENTS

| | | | |
|---|---|---|---|
| 7,245,720 B2* | 7/2007 | Wajs | 380/210 |
| 7,447,903 B2 | 11/2008 | Sandhu et al. | |
| 7,546,618 B2 | 6/2009 | Bacon | |
| 7,552,457 B2 | 6/2009 | Van De Ven et al. | |
| 7,577,253 B2 | 8/2009 | Schipper et al. | |
| 7,684,567 B2 | 3/2010 | Maillard et al. | |
| 7,908,491 B2 | 3/2011 | Kudelski et al. | |
| 7,924,835 B2* | 4/2011 | Platnic | 370/390 |
| 7,986,781 B2 | 7/2011 | Stransky | |
| 8,165,293 B2 | 4/2012 | Wajs | |
| 8,789,165 B2 | 7/2014 | Bildgen et al. | |
| 9,392,319 B2 | 7/2016 | Duval et al. | |
| 2001/0046299 A1 | 11/2001 | Wasilewski et al. | |
| 2002/0044658 A1* | 4/2002 | Wasilewski et al. | 380/239 |
| 2002/0126847 A1 | 9/2002 | Wajs et al. | |
| 2002/0168963 A1* | 11/2002 | Wajs | 455/411 |
| 2004/0181811 A1 | 9/2004 | Rakib | |
| 2004/0215691 A1* | 10/2004 | Maria Van De Ven et al. | 709/200 |
| 2005/0025312 A1 | 2/2005 | Rijkaert et al. | |
| 2005/0105886 A1* | 5/2005 | Abelard et al. | 386/94 |
| 2005/0125195 A1 | 6/2005 | Brendel | |
| 2005/0168323 A1* | 8/2005 | Lenoir et al. | 340/5.74 |
| 2005/0235307 A1* | 10/2005 | Relan et al. | 725/14 |
| 2005/0235308 A1 | 10/2005 | Dellow et al. | |
| 2006/0117392 A1* | 6/2006 | Courtin | H04N 7/1675 726/27 |
| 2007/0076872 A1 | 4/2007 | Juneau | |
| 2007/0112580 A1* | 5/2007 | Tang-Talpin et al. | 705/1 |
| 2007/0174472 A1 | 7/2007 | Kulakowski | |
| 2007/0201695 A1 | 8/2007 | Saarikivi | |
| 2007/0230700 A1 | 10/2007 | Dekker et al. | |
| 2008/0028467 A1 | 1/2008 | Kommareddy et al. | |
| 2008/0133749 A1 | 6/2008 | Sample | |
| 2008/0192927 A1* | 8/2008 | Stransky | 380/42 |
| 2008/0279379 A1 | 11/2008 | Muijen | |
| 2008/0298585 A1 | 12/2008 | Maillard et al. | |
| 2008/0301437 A1* | 12/2008 | Chevallier et al. | 713/155 |
| 2009/0077379 A1 | 3/2009 | Geyzel et al. | |
| 2009/0323949 A1 | 12/2009 | Chieze et al. | |
| 2010/0017605 A1 | 1/2010 | Chieze et al. | |
| 2010/0034389 A1 | 2/2010 | Sakharov | |
| 2010/0169664 A1 | 7/2010 | Danois et al. | |
| 2010/0268771 A1 | 10/2010 | Kulakowski et al. | |
| 2010/0310068 A1 | 12/2010 | Fischer | |
| 2012/0096547 A1 | 4/2012 | Barau et al. | |
| 2012/0328099 A1 | 12/2012 | Duval et al. | |
| 2013/0031576 A1 | 1/2013 | Koemmerling | |
| 2013/0121485 A1 | 5/2013 | Boivin et al. | |
| 2014/0283034 A1 | 9/2014 | Duval et al. | |

FOREIGN PATENT DOCUMENTS

| | | |
|---|---|---|
| EP | 2262259 | 12/2010 |
| EP | 2357783 | 8/2011 |
| JP | 2004/186714 A | 7/2004 |
| WO | WO 2010/000876 | 1/2010 |

OTHER PUBLICATIONS

European Search Report for EP 13199732.2 mailed Jul. 3, 2014, 8 pages.
Francis et al. (2005) Australasian Information Security Wrokshop: Digital Rights Management 44:1-6 "Countermeasures for attacks on satellite TV cards using open receivers".
European Search Report for EP Application No. 11868319.2, mailed Dec. 4, 2014, 6 pages.
U.S. Appl. No. 13/840,357, Non-Final Office Action mailed Dec. 18, 2014, 40 pages.
U.S. Appl. No. 13/840,357, Amendment and Response filed Mar. 18, 2015, 15 pages.
U.S. Appl. No. 13/840,357, Final Rejection mailed Apr. 21, 2015, 11 pages.
Canadian Patent Application No. 2,833,234, Office Action mailed Sep. 25, 2015, 6 pages.
EP Application No. 131997322, Office Action mailed Aug. 4, 2015, 6 pages.
U.S. Appl. No. 13/840,357, Amendment and Response filed Sep. 21, 2015, 14 pages.
U.S. Appl. No. 13/840,357, Non-Final Rejection mailed Oct. 7, 2015, 9 pages.
U.S. Appl. No. 13/840,357, Amendment and Response filed Feb. 10, 2016, 12 pages.
U.S. Appl. No. 13/840,357, Notice of Allowance mailed Mar. 9, 2016, 7 pages.

* cited by examiner

Sequence of ECM decryption requests for a card used in normal condition

Sequence of ECM decryption requests for a card used in an IKSS

ANTI-SPLITTER VIOLATION CONDITIONAL KEY CHANGE

BACKGROUND

Protected content is broadcast over a network, such as the Internet or a satellite, terrestrial, or cable network. Often, subscribers must pay for the content in order to access it. In order to limit the content to legitimate subscribers, the content is scrambled using one or more keys that are made available to legitimate subscribers. However, pirate users may commandeer a legitimate system in order to access the one or more keys. Upon accessing the one or more keys, the keys may be shared with other pirated users thereby allowing them unauthorized access to the protected content. It is with respect to this general environment that embodiments of the present disclosure have been contemplated.

SUMMARY

Embodiments of the present disclosure relate to systems and methods to perform a conditional key change in a DVB system or other data transmission system. In one embodiment, a counter is maintained on a device such as a set-top-box, a computer, or a smart card. When the device receives an initial message the counter is incremented. Every time the device receives a message that is related to content different from the previous message, the counter may be incremented again. In such embodiments, the device receives a management message, for example, a message that contains a key necessary to decrypt other messages, the device checks the counter before accessing the key. If the counter is below a threshold, the device obtains the key from the management message and is able to access later received messages. If the counter is above the threshold, the management message is disregarded and the device is not able to access later received messages.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
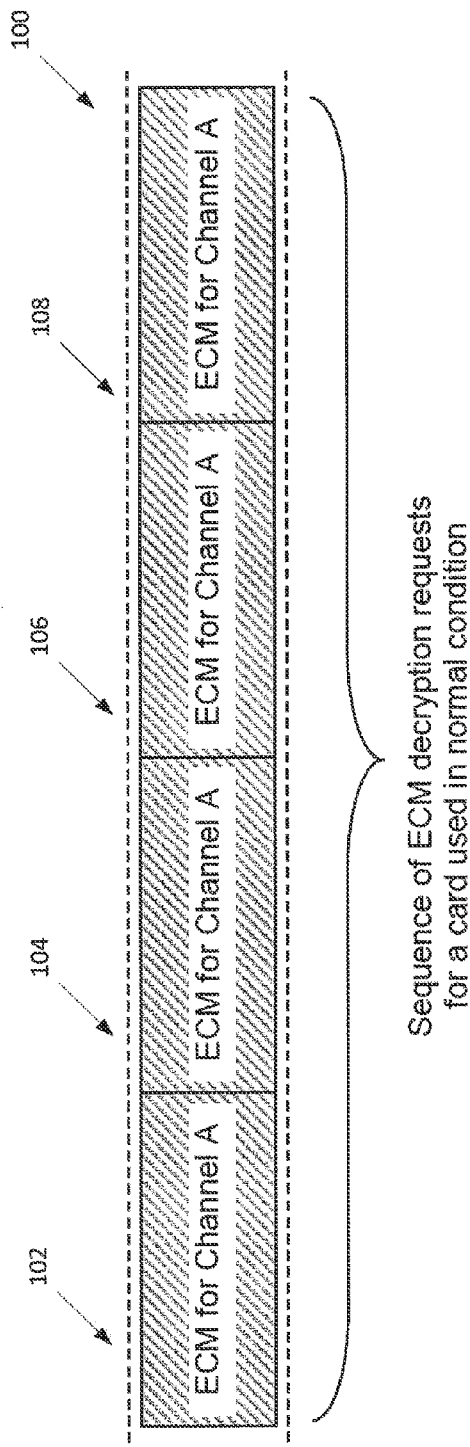
FIG. 1 is an embodiment of an illustration of a sequence 100 of ECM decryption requests made in a legitimate system.

The various embodiments described herein generally provide systems and methods for providing a countermeasure to the piracy of protected content by employing a conditional key change in a protected system. In embodiments, the systems and methods disclosed herein may be practiced within a Digital Video Broadcasting (DVB) compliant system. DVB is a set of internationally accepted open standards for broadcasting digital television. The DVB standards define both the physical layer and the data link layer of a distributed system. There are DVB standards defining the distribution of content over various different mediums. For example, satellite transmissions are defined in the DVB-S, DVB-S2, and DVB-SH specifications. Cable transmission is defined in the DVB-C and DVB-C2 specifications. Terrestrial television transmission is defined in the DVB-T and DVB-T2 specifications for standard television formats and DVB-H and DVB-H2 for the transmission of mobile television, e.g., television for handheld devices such as mobile phones. Microwave transmission is defined in the DVB-MT, DVB-MC, and DVB-MS standards.

In addition to defining the physical and data link layers, the DVB specifications include three standards that are used to provide conditional access protection of the transmitted content. These standards include the DVB-CA, DVB-CSA, and DVB-C1 standards. Conditional access generally refers to protecting content by requiring a device to meet certain criteria before it accesses content. Conditional access plays an important role in ensuring that broadcasted content is made available only to subscribers of a particular broadcast system (e.g., cable and satellite customers, etc). The general DVB architecture uses a global key, called a control word (CW), to perform conditional access. The CW is used to scramble data before it is broadcast to subscribers. The CW is transmitted by a head-end (e.g., a satellite or cable provider) to subscriber devices in an entitlement control message (ECM). The ECM is generally encrypted before transmission to the subscriber device. The conditional access system of the subscriber devices (e.g., a smart card or other conditional access module whether in hardware or software) decrypts the ECM using information received in an entitlement management message (EMM) transmitted from the head-end. The subscriber device can then use the CW to descramble the content broadcasted by the head-end. Generally, a CW is used for a certain period of time, or a crypto period. Upon expiration of a crypto period a new crypto period begins. The head-end may then transmit a new CW to subscriber devices and proceeds to use the new CW to scramble the broadcasted content.

One of the main weaknesses of the DVB conditional access architecture is that a CW can be decrypted and easily shared over the Internet. Generally, a CW may consist of eight bytes. The duration of a crypto period may vary between five to sixty seconds. Thus, all it takes for a non-subscriber to defeat the DVB conditional access architecture is the discovery of the eight-byte CW, a task which may be accomplished within the duration of a typical crypto period. While embodiments of this disclosure are described with respect to a typical DVB system, one of skill in the art will appreciate that the embodiments disclosed herein may be practiced with content protection systems other than a DVB system.

In the context of control word sharing, a legitimate and/or subscribed smart card may be used within an Internet Key Sharing Server (IKSS) pirate device that may extract control words and distribute them over the Internet. A pirate user may connect to the IKSS to access the extracted control words, thus providing the pirate with the ability to illegally descramble protected content, such as pay-tv services.

With respect to a television system employing the DVB architecture, an IKSS may use its subscribed smart card to descramble as many channels as possible, thereby providing pirate users with access to as many channels as possible. For example, a typical IKSS may use the subscribed smart card to descramble up to thirty channels in parallel. As previously discussed, a control word necessary to descramble a channel may change every few seconds. That means, for each channel, an ECM containing the control word may be broadcasted every few seconds. The IKSS may therefore need to submit an ECM decryption request to the subscribed smart card for thirty channels every few seconds. Thus, the amount of ECM decryption requests on a pirated smart card may be significantly greater than the requests made to a legitimate smart card.

On the other hand, a typical user only has the capability to access a few channels at a time. For example, a standard set-top-box is equipped with two tuners which allow a user to watch and/or record up to two channels simultaneously. That means a legitimate smart card generally only receives a request to decrypt an ECM for one or two channels every few seconds. FIG. 1 is an embodiment of an illustration of a sequence 100 of ECM decryption requests made in a legitimate conditional access system. For example, FIG. 1 illustrates the sequence 100 of decryption requests that a typical set-top box may submit to a smart card in a legitimate conditional access system. Generally, a legitimate user will only submit requests for one channel at a time. For example, the sequence 100 illustrates a string of 4 ECM decryption requests (102-108) submitted to a conditional access system (e.g., a smart card), all of which are for Channel A. Such request sequences typically exemplify legitimate access of protected content. Although FIG. 1 is described with respect to a conditional access system employing a smart card, this sequence 100 of decryption requests depicted in FIG. 1 may be applicable to any type of conditional access system employed in the art.

Figure 2:
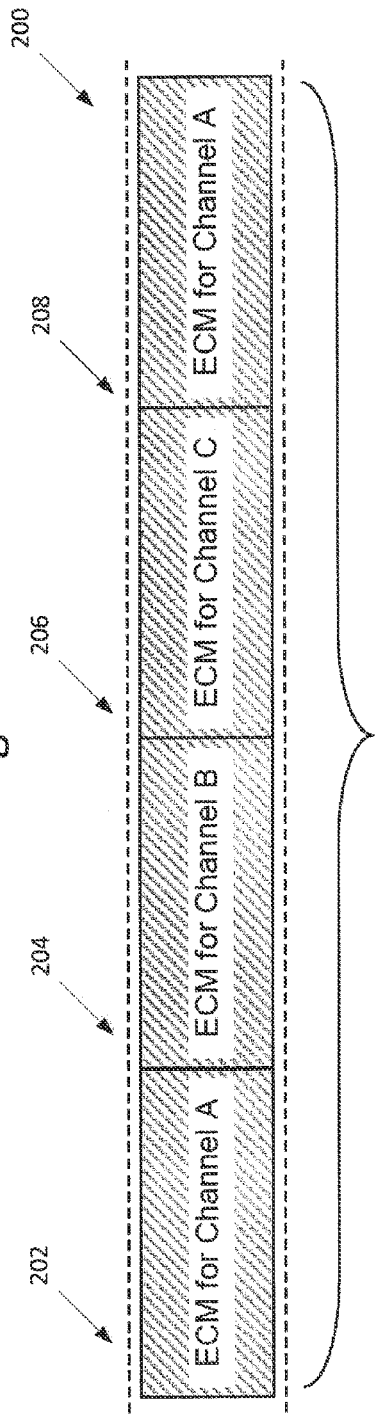
FIG. 2 is an embodiment of an illustration of a sequence 200 of ECM decryption requests made in a pirated system.

FIG. 2, on the other hand, is representative of a sequence 200 of ECM decryption requests made to a pirated conditional access system. Unlike the legitimate sequence 100, the pirate sequence 200 consists of four ECM decryption requests (202-208) corresponding to four different channels. The sequence 200 is consistent with the behavior of a pirated smart card under control of an IKSS. The IKSS will attempt to gather and share as many CW's as possible by submitting ECM decryption requests for multiple channels in parallel. This provides pirate users with access to as much of the protected content as possible. One of skill in the art will appreciate that the legitimate and pirate sequences described in FIGS. 1 and 2 are applicable to content protection systems other than the DVB system and the countermeasure embodiments provided herein are equally applicable to content protection systems other than the DVB system described herein.

The difference in the pattern of decryption requests illustrated in sequences 100 and 200 may be exploited to provide a countermeasure to pirate systems, such as an IKSS. In embodiments, a counter is maintained by the conditional access system (e.g., a set-top-box, smart card, or any other type of processor for performing conditional access). The counter may be initialized to a default value. Upon the initial request to decrypt and access a content key (e.g., a control word), the counter is incremented by a value or corresponding to a function. Upon each subsequent request, the conditional access system does a comparison of the request to the previous request. If the request is different from the previous request (e.g., the request is for a key to access different content) the counter is again incremented by an increment value. However, if the request matches the previous request, the counter is decremented by a decrement value or corresponding function. In embodiments, the increment and decrement values may be the same. In other embodiments, the increment and decrement values may be different.

Eventually, the conditional access system will receive a management message. In embodiments, a management message is any message that contains one or more keys necessary to decrypt messages containing content keys. For example, in a DVB environment, a management message may be an EMM which contains a transmission key (TK) necessary to decrypt ECMs. In embodiments, a transmission key may be a hash value, a numeric value, an alphanumeric key, or any other type of key value known to the art. Upon receiving the management message, the conditional access system compares the counter against a threshold. The threshold may be predefined, for example, by the conditional access system, by a content provider or by a head-end. In other embodiments, the threshold may be dynamically generated by the conditional access system. In still other embodiments, the threshold may be defined by a management message, such as but not limited to, an EMM. If the counter is below the threshold, the conditional access system will decrypt the management message to retrieve the one or more keys necessary to decrypt messages containing content keys. However, if the counter is above the threshold, the conditional access system may disregard the management message. By doing so, the conditional access system discards the key necessary to access later received content keys, thereby losing the ability to access protected content (e.g., during later crypto-periods).

The conditional key change method described above provides the conditional access system with the ability to detect pirate activity and deploy countermeasures (e.g., the discarding of keys) to combat pirated use. For example, with respect to the pirate sequence illustrated in FIG. 2, the counter will be incremented after each decryption request because each subsequent request differs from the previous request. Thus, the counter will eventually surpass the threshold value and the conditional access system will then discard any received management messages, thereby denying access to subsequent content keys received by the pirated system. On the other hand, in the case of legitimate use illustrated in FIG. 1, because most subsequent requests are the same as the previous request, the counter will be generally decremented. That is, while in some instances a legitimate conditional access system may cause the counter to increment, however, the counter will generally be decremented in a legitimate conditional access system. In a legitimate conditional access system, the counter will thus remain below the threshold value and the conditional access system will continue to decrypt management messages, thereby allowing continued access to content keys.

The embodiment described above may be employed in a system employing the DVB architecture to conditionally perform a decryption key change based on the counter value in every conditional access system. In such embodiments, ECM decryption requests made to the conditional access system (e.g., a set-top-box or smart card) are performed using a TK. Such conditional access systems use the TK to decrypt the ECM and retrieve the CW carried by the ECM. As previously described, the TK is delivered in an EMM and is updated regularly. The TK is persistently stored in the conditional access system until it is replaced by a new one. However, the TK may be conditionally replaced using the methods and systems described herein. In embodiments, when the conditional access system receives an EMM, the counter is checked to determine if it is lower than a specific threshold value. In embodiments, the threshold value may be defined by the conditional access system. In other embodiments, the threshold value may be defined by the EMM. If the counter value is below the threshold value, the EMM is decrypted and the new TK is stored by the conditional access system, thereby providing the conditional access system with the ability to decrypt future ECMs. However, if the counter value is greater than the threshold value, the EMM may be disregarded and the conditional access system may respond by not storing or considering the new TK. In further embodiments, a false TK may be provided if the counter is above the threshold. In such embodiments, the false TK may be generated by the conditional access system or may be provided by the EMM.

Figure 3:
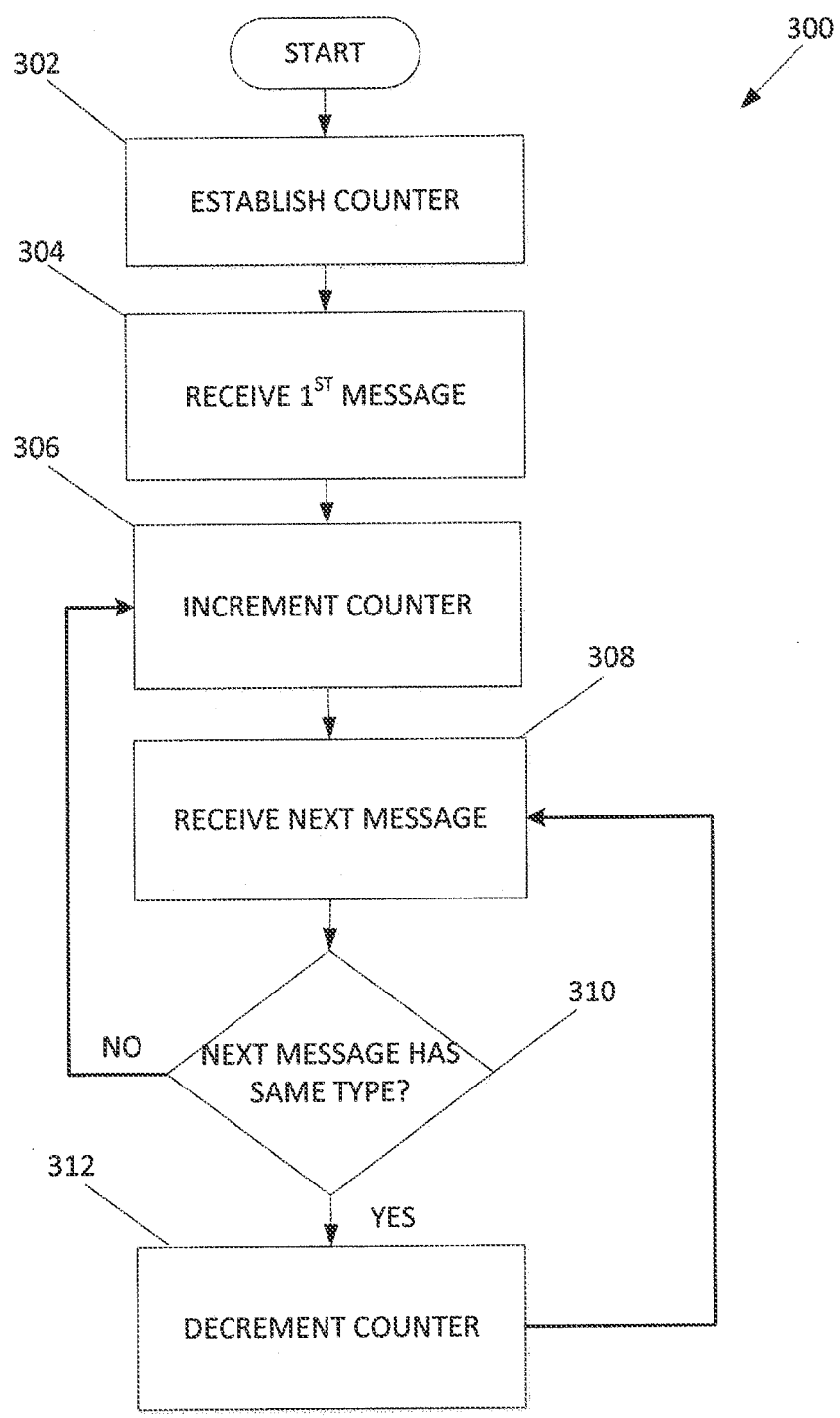
FIG. 3 is a flow chart illustrating an embodiment of a method 300 for maintaining a counter that may be used to employ control word sharing countermeasures.

FIG. 3 is a flow chart illustrating an embodiment of a method 300 for maintaining a counter that may be used to employ control word sharing countermeasures. Flow begins at operation 302, where a counter is established. For example, the counter may be established by a conditional access system employed by a computer, a set-top-box, a smart card, or any other type of device. In embodiments, establishing the counter includes setting the counter to a default value. The default value may be defined by the conditional access system or by the administrator of the protected content (e.g., a head-end). After establishing the counter, flow proceeds to operation 304. At operation 304, a first message is received by the conditional access system. In embodiments, the first message may have a message type. The message type may relate to the type of message received (e.g., a content key message, a management message, etc). In other embodiments, the message type may refer to the payload made by the message (e.g., the type of content key carried by the message). For example, the message type may indicate that the message contains a key to access specific content (e.g., a specific video stream, a specific audio stream, a specific file, specific software, etc). In embodiments, the message may be a request to access specific content, a request to access a key related to specific content, or any other type of message related to acquiring or accessing content. For example, the message may be an ECM or a request to decrypt an ECM.

Flow proceeds to operation 306, where the counter is incremented. Flow then proceeds to operation 308, whereupon the conditional access system receives the next message (e.g., the second message). In embodiments, the message may be a request to access specific content, a request to access a key related to specific content, or any other type of message related to acquiring or accessing content. For example, the message may be an ECM or a request to decrypt an ECM. Flow proceeds to decision operation 310 where a determination is made whether the next message has the same type as the previous message. For example, the next message has the same type if it is a request to access the same protected content as the previous, if it is a request to access the same content key as the previous message, etc. One of skill in the art will appreciate that any method of identifying similar types may be employed with the embodiments disclosed herein at operation 310. If the message has a different type, flow branches NO to operation 312. At operation 312, the counter is incremented by a value X. One of skill in the art will appreciate that the counter may be incremented by any value at operation 312 without departing from the spirit of the methods and systems disclosed herein. Flow then returns to operation 308 where the next message is received (e.g., a subsequent message) and the method cycles the steps of determining whether the next message (e.g., the subsequent message) is the same as the previous message.

If the message has the same type, flow branches YES from operation 310 to operation 314, at which point the counter is decremented by a value Y. One of skill in the art will appreciate that the counter may be incremented by any value at operation 312 without departing from the spirit of the methods and systems disclosed herein. In embodiments, the value Y may be the same or different from the value X. Flow then returns to operation 308 where the next message is received (e.g., a subsequent message) and the method cycles the steps of determining whether the next message (e.g., the subsequent message) is the same as the previous message.

Figure 4:
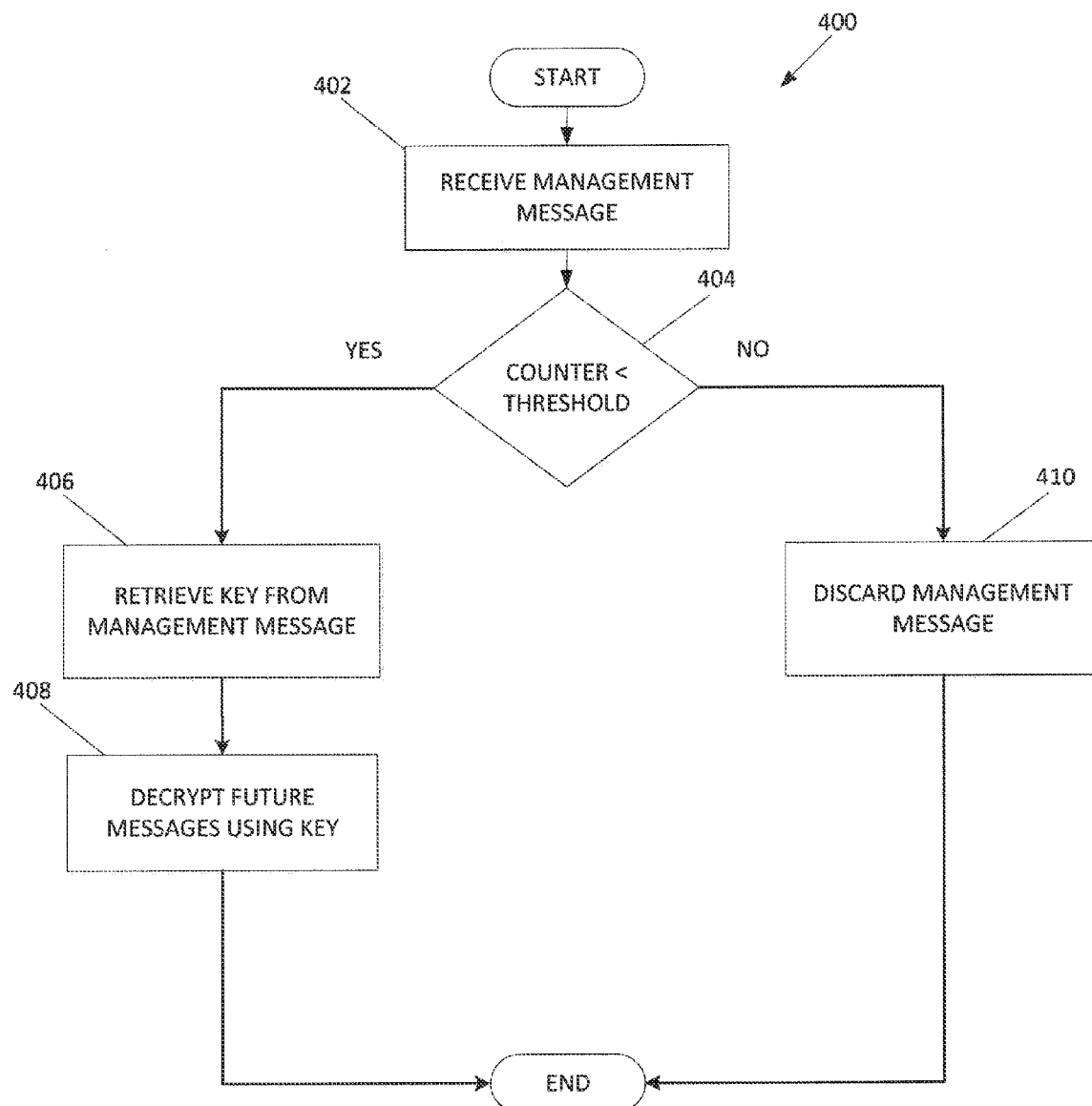
FIG. 4 is a flow chart illustrating an embodiment of a method 400 for employing control word sharing countermeasures based upon a counter.

FIG. 4 is a flow chart illustrating an embodiment of a method 400 for employing control word sharing countermeasures based upon a counter. Flow begins at operation 402 where a management message is received. In embodiments, a management message may be a message containing a key that is used to access other content related messages. For example, the management message may be an EMM. Flow continues to decision operation 404 where a counter is checked to determine if it is below a certain threshold. In one embodiment, the threshold value may be defined by a conditional access system. In such embodiments, the threshold value may be dynamically generated by a conditional access system. In other embodiments, the threshold value may be statically stored by a conditional access system. In such embodiments, the threshold value may be periodically updated by a content controller, such as a head-end, by pushing new threshold values to the conditional access system. In still other embodiments, the threshold value may be defined by the management message. In an embodiment, the threshold value may be an integer value. One of skill in the art will appreciate that other threshold values may be used with the methods disclosed herein.

If the counter is below the threshold value, flow branches YES to operation 406. At operation 406, a key, such as, but not limited to, a TK is retrieved from the management message. For example, the management message may be decrypted by a conditional access system in order to retrieve the key. In embodiments, the key provides the conditional access system with the ability to access content specific keys. For example, the key may be required to decrypt other messages, such as, but not limited to, ECM messages in order to access content specific keys. Flow continues to operation 408, where the key is used to decrypt any subsequent messages received by the conditional access system.

If the counter is above the threshold value, flow branches NO to operation 410. At operation 408, the management message is disregarded by the conditional access system. For example, the conditional access system may not decrypt the management message, thereby losing access to the key contained in the management message. In other embodiments, disregarding the management message may include retrieving a false key. In one such embodiment, the false key may be generated by the conditional access system. In another embodiment, the false key may be provided by the management message. Because the conditional access system disregards the management system at operation 408, the conditional access system either does not have a key or has an inoperable key (e.g., a false key) after completing operation 408. In embodiments, the key carried by the management message is required to decrypt any subsequent messages received by the conditional access system. The conditional access system will not be able to decrypt any subsequent messages, thereby losing access to any protected content.

The method 400 may be employed by a countermeasure to control word sharing. For example, a conditional access system under the control of an IKSS (e.g., an IKSS utilizing a subscribed smart card) employing the method 400 will eventually reach a threshold at which point it will no longer decrypt management messages. If the conditional access system does not decrypt the management message to access the one or more keys provided by the management message, it will no longer be capable of decrypting any subsequent messages carrying content keys. By doing so, the pirated conditional access system becomes inoperable and pirate users are no longer able to access protected content.

Figure 5:
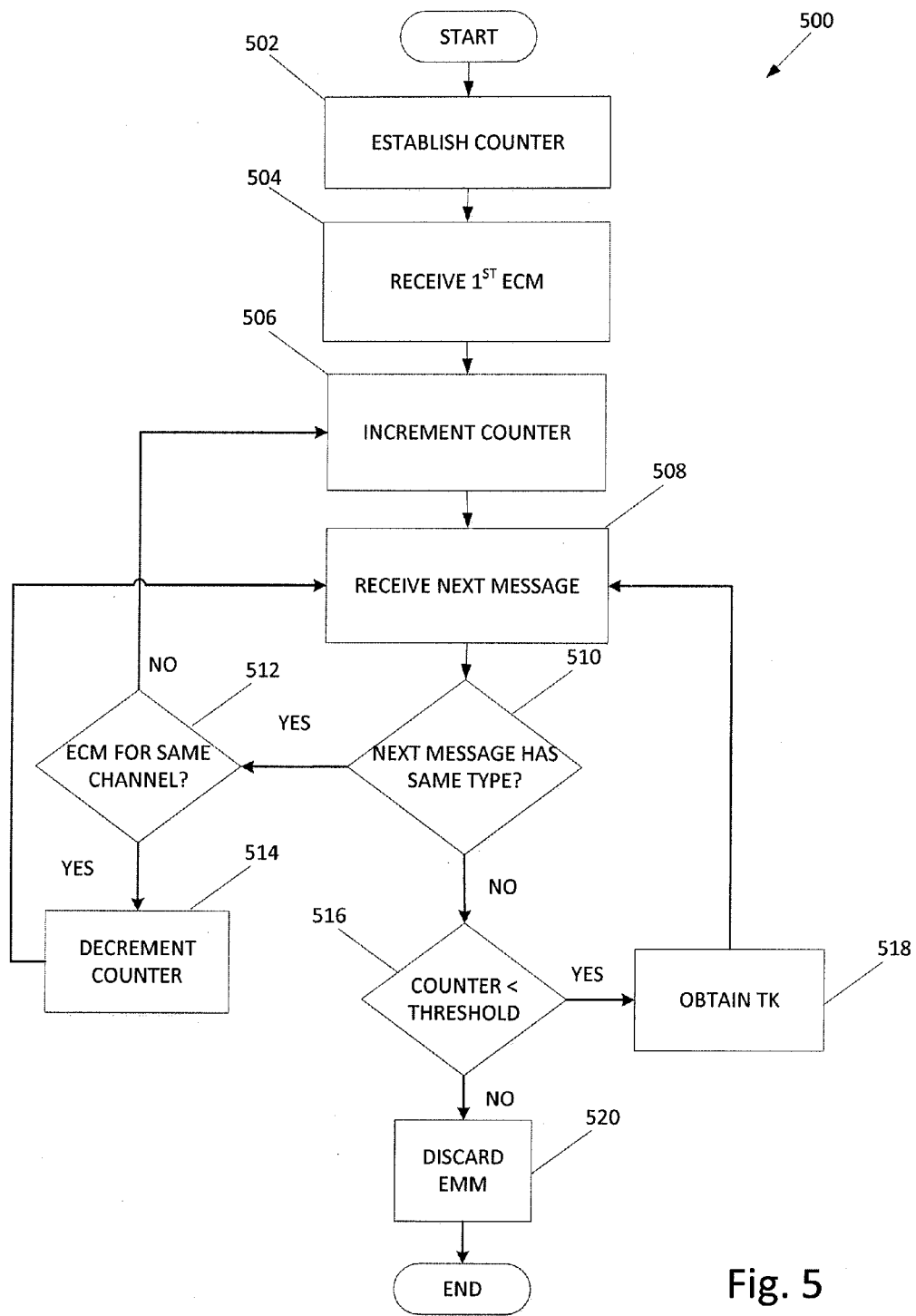
FIG. 5 is a flow chart illustrating an embodiment of a method 500 for an anti-splitter conditional key change countermeasure in a DVB system.

FIG. 5 is a flow chart illustrating an embodiment of a method 500 for an anti-splitter conditional key change countermeasure in a DVB system. The method 500 may be performed using a general computer, a set-top-box, a smart card, or any other conditional access system. Flow begins at operation 502 where the conditional access system establishes a counter. In embodiments, establishing the counter includes setting the counter to a default value. The default value may be defined by the conditional access system or by the administrator of the protected content (e.g., a head-end).

Flow continues to operation 504 where a first ECM or a first request to decrypt an ECM is received after establishing the counter. In embodiments, the ECM contains a key necessary to access specific protected content. For example, the ECM may contain a key required to access the video stream of a particular channel. In further embodiments, the ECM is encrypted. Flow continues to operation 506 where the counter is incremented by a value X. One of skill in the art will appreciate that the counter may be incremented by any value without departing from the spirit of the disclosure. Flow continues to operation 508 where a next message is received. For example, the next message may be another ECM, an EMM, or any other type of message that is employed by the DVB architecture. In other embodiments, the next message may be a request to decrypt or otherwise access an ECM, an EMM, or any other type of message that is employed by the DVB architecture.

Flow continues to decision operation 510 where a determination is made as to whether the next message is another ECM or another request to decrypt an ECM. If the next message is another ECM or another request to decrypt an ECM, flow branches YES to decision operation 512. At decision operation 512 a determination is made as to whether the ECM or request to decrypt an ECM is for the same content (e.g., the same channel) as the previously received ECM. If the ECM is the same, flow branches YES to operation 514 and the counter is decremented by a value Y. In one embodiments, the value Y may be the same or different from the value X. Flow then returns to operation 508. Returning to operation 512, if the ECM or the request to decrypt an ECM is different from the previously received ECM or the previous request to decrypt the ECM (e.g., the request is to access different content or a different content key), flow branches NO to operation 506 where the counter is again incremented by the value X and flow continues from there.

Returning to operation 510, if the next message is not an ECM or a request to decrypt an ECM, flow branches NO to decision operation 516. In embodiments, if the message is not an ECM then it may be an EMM or a request to decrypt an EMM. At decision operation 516, the counter is check to see if it is below a specified threshold value, in one embodiment, the threshold value may be defined by a conditional access system. In such embodiments, the threshold value may be dynamically generated by a conditional access system. In other embodiments, the threshold value may be statically stored by a conditional access system. In such embodiments, the threshold value may be periodically updated by a content controller, such as a head-end, by pushing new threshold values to the conditional access system. In still other embodiments, the threshold value may be defined by the EMM.

If the counter is below the specified threshold value, flow branches YES to operation 518. At operation 518, the TK is retrieved from the EMM (e.g., by decrypting the EMM or otherwise accessing the EMM). Retrieval of the TK allows the conditional access system to decrypt any subsequently received ECMs. Flow then returns to operation 508 and continues from there. Returning to operation 516, if the counter is not below the specified threshold value, flow branches NO to operation 520. At operation 520, the EMM is disregarded. For example, the conditional access system may not decrypt the EMM, thereby losing access to the TK contained in the EMM. In other embodiments, disregarding the EMM may include retrieving a false TK. In one such embodiment, the false TK may be generated by the conditional access system. In another embodiment, the false TK may be provided by the EMM. Because the TK is not accessed at operation 520, the conditional access system loses the capability of decrypting any subsequently received ECMs, thereby becoming inoperable to descramble protected content. Flow terminates from operation 520.

Figure 6:
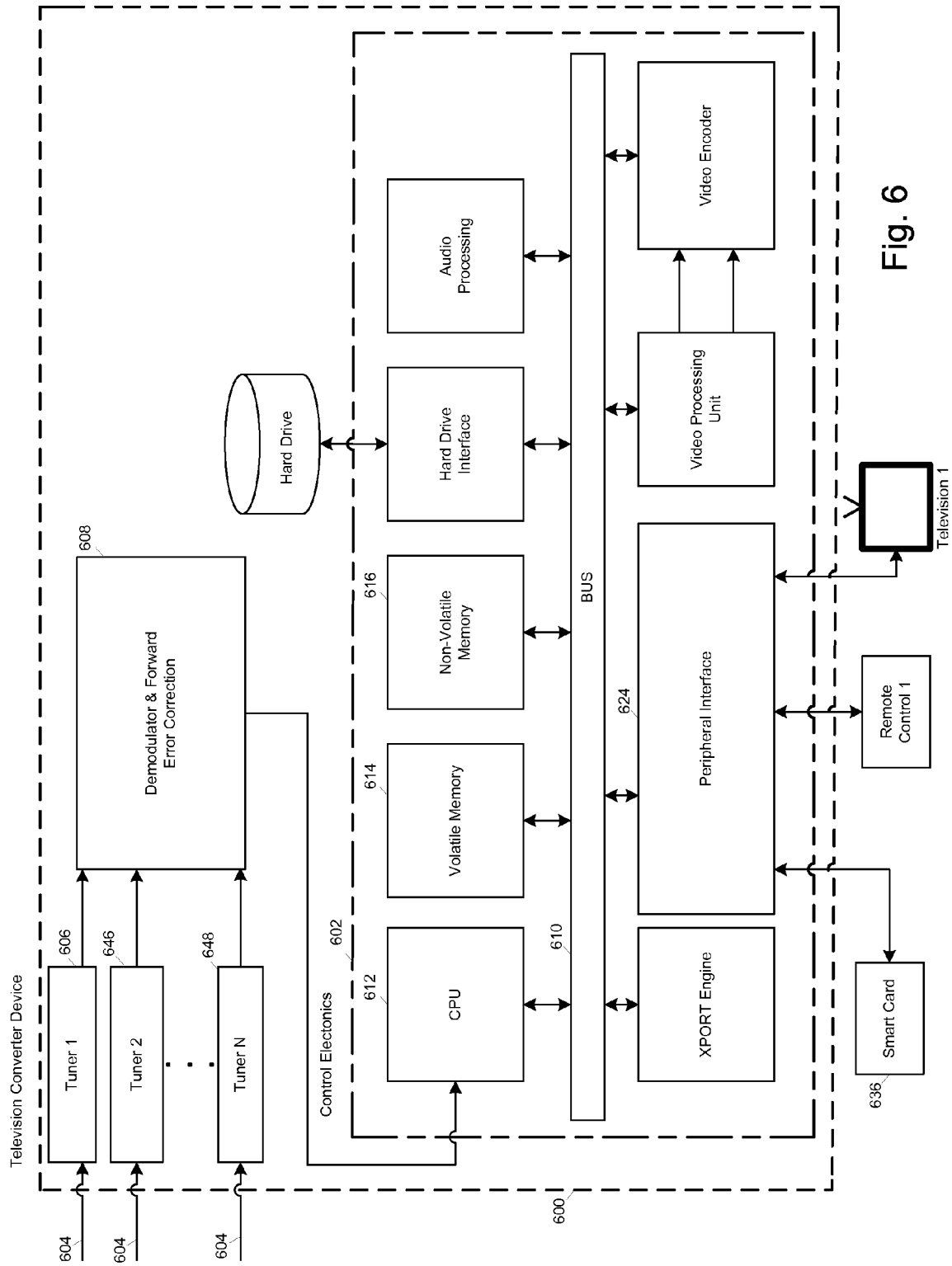
FIG. 6 is an embodiment of a set-top-box 600 that may be utilized to employ the methods disclosed herein.

FIG. 6 is an embodiment of a set-top-box 600 that may be utilized to employ the methods disclosed herein. While FIG. 6 is illustrated with various components, many of the components are known to the art and do not need explanation. Only the components that may be used to perform the methods disclosed herein are described. The signal 604 that arrives at the set-top-box 600 may undergo extensive processing. The television converter 600 may include one or more tuner devices 606, 646, 648 that may receive a satellite signal 604. In this embodiment, tuner devices 606, 646, 648 acquire a signal 604 from a head-end or content provider. Tuner devices 606, 646, 648 may initially process the signal 604. Tuner device 606, 646, 648 may also receive subscriber commands in the form of signals from control electronics unit 602. Signals from control electronics unit 602 may include, but is not limited to, a signal to tune to a transponder as part of the process of selecting a certain channel for viewing on a peripheral device. One skilled in the art would recognize that the tuner devices 606, 646, 648 may include fewer, more, or different components. The signal 604 may include content encoded by a CW. The signal 604 may also include one or more ECMs and EMMs.

After receiving the signal 604, one of the first steps may be to demodulate 608 the signal 604. The signal 604 may arrive as an analog signal that "carries" data (e.g., data is modulated onto the analog signal). Demodulation 608 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 604 may be possible. Another one of the first steps may also be to error check 608 signal 604. One example of error checking 608 is forward error checking (FEC). FEC 608 may include, but is not limited to, inspecting parity bit or bits that may accompany signal 604. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In embodiments, set-top-box 600 contains control electronics unit 602 that receives signal 604. One skilled in the art will recognize that control electronics 602 may receive other signals, including, but not limited to, signals from a cable, satellite, or broadcast television distributor. In this embodiment, control electronics unit 602 includes discrete electronic components combined into a single circuit with a shared bus 610. In other embodiments, control electronics unit 602 may be configured differently. For example, one or more of the control electronics unit 602 components in set-top-box 600 may be combined or omitted. As a further example, one or more of the control electronics unit 602 components in set-top-box 600 may not share a bus 610, but may nonetheless be operatively connected by some other means. One skilled in the art will recognize that other configurations of set-top-box 600 and control electronics unit 602 are possible and within the scope of this invention. One skilled in the art will further recognize that some components of set-top-box 600 and control electronics unit 602 may be implemented in hardware or software. The control electronics unit 602 may operate under the control of a software program, firmware program, or some other program stored in memory or control logic. One skilled in the art will also recognize that the control electronics unit 602 may include other electronic components or structures to mediate or process signals.

Control electronics unit 602 may contain one or more central-processing-units (CPUs) 612 or processors. In this embodiment, control electronics unit 602 contains a single CPU 612 that is operatively connected to the shared bus. In this embodiment, CPU 212 may be used, among other things, for logical operations for set-top-box 600 functions including, but not limited to, channel selection, recording control, EPG display and control and system maintenance. One skilled in the art will recognize that the CPU 612 may be integrated with memory or other discrete electronics components. In embodiments, CPU 612 may be used to perform the systems and methods disclosed herein.

Control electronics unit 602 may contain one or more volatile memory components 614. Volatile memory components 614 may include, but are not limited to, one or more SDRAM memory chips. Similarly, control electronics unit 602 may also contain one or more non-volatile memory components 616. Non-volatile memory 616 may include one or more memory chips, including, but not limited to, ROM, SRAM, SDRAM and Flash ROM. One skilled in the art will recognize that volatile memory 614 and non-volatile memory 616 may be integrated within other electronics components. One skilled in the art will also recognize that other memory components may be included within set-top-box 600 and control electronics unit 602. One skilled in the art will recognize that memory 614, 616 may be used for many purposes, including, but not limited to, storing EPG data and storing data for use by CPU 612, in embodiments, the Volatile memory components 614 and/or one or more non-volatile memory components 616 may be used to store the counter or executable instructions to perform the methods 300-500 disclosed herein.

A set-top-box 600 may be connected to one or more peripheral electronic devices through peripheral interface 624. These peripheral devices may include a smart card 636. In embodiments, the smart card 636 acts as a conditional access system. In such embodiments, the smart card 636 performs the methods 300-500 disclosed herein.

Figure 7:
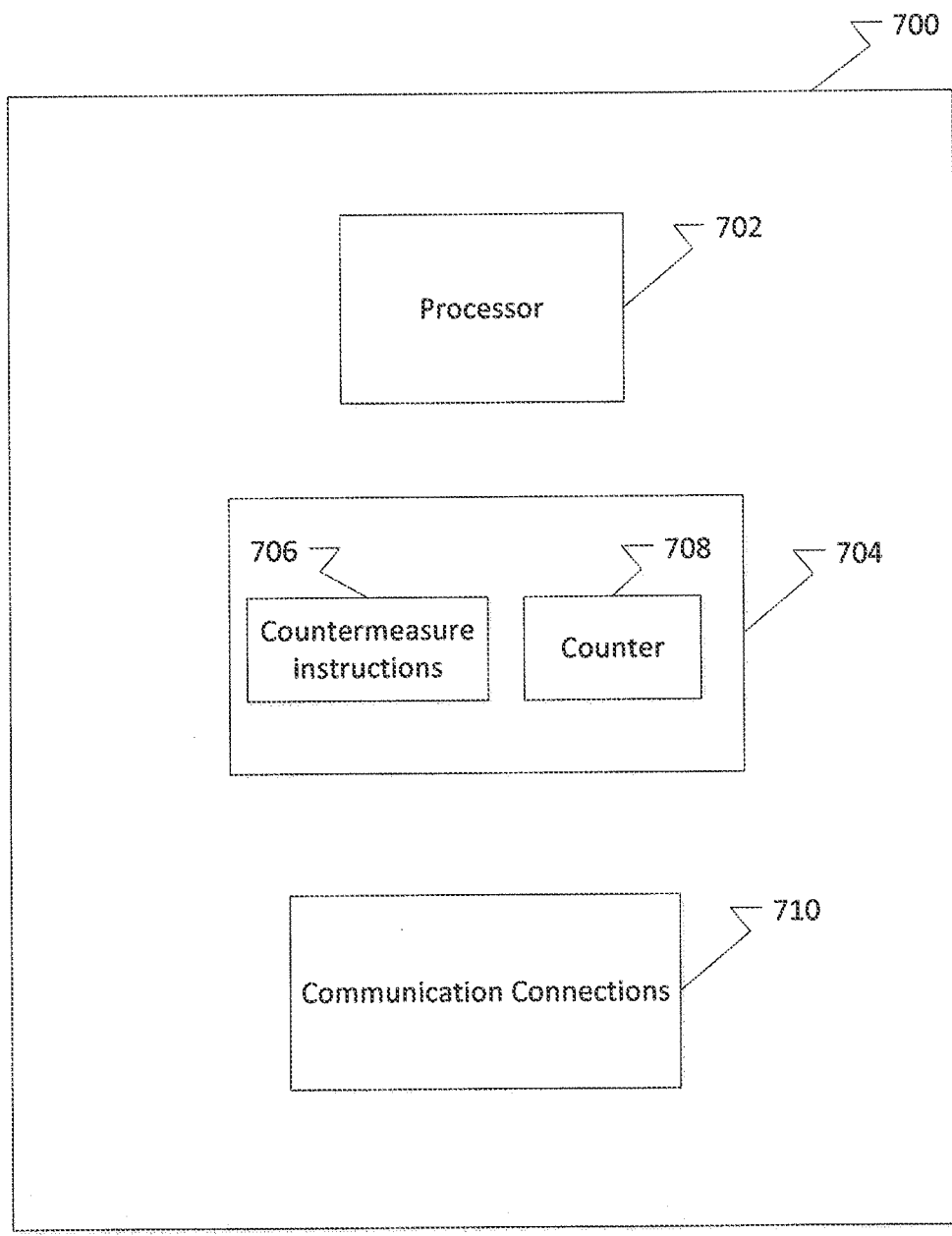
FIG. 7 is an illustration of an embodiment of a smart card 700 that may be employed to perform the systems and methods disclosed herein.

FIG. 7 is an illustration of an embodiment of a smart card 700 that may be employed to perform the systems and methods disclosed herein. In embodiments, smart card 700 includes one or more processing units 702. In some embodiments, one or more components of the methods described herein are performed by the one or more processing units 702. For example, the processing unit 702 may establish, increment, and/or decrement the counter, or perform the various decision operations described herein. The one or more processing units 702 may also perform decryption of the ECMs and EMMs disclosed herein. The one or more processing units 702 may also generate and or provide the false keys described herein.

Smart card 700 may also include memory 704. Memory 704 includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information and which is accessed by smart card 700 and one or more processing units 702. Memory 704 may store executable instructions to perform the methods disclosed herein. For example, memory 704 may include countermeasure instructions 706 to perform the countermeasures described herein. Memory may also store the counter and/or counter values 708.

Smart card 700 may also contain communications connection(s) 710 that allow the device to communicate with other devices. Communication connection(s) 710 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In embodiments, ECMs and EMMs and or request to decrypt such may be received over communications connection(s) 710. In still further embodiments, the instructions to perform the countermeasures described herein may be received via communications connection(s) 710. For example, a head-end update smart card 700 with instructions to perform the methods disclosed herein. The instructions may be stored in memory 704. Communications connection(s) 710 thereby allows a head-end to update smart cards deployed in the field to be with instructions to perform the methods herein.

Figure 8:
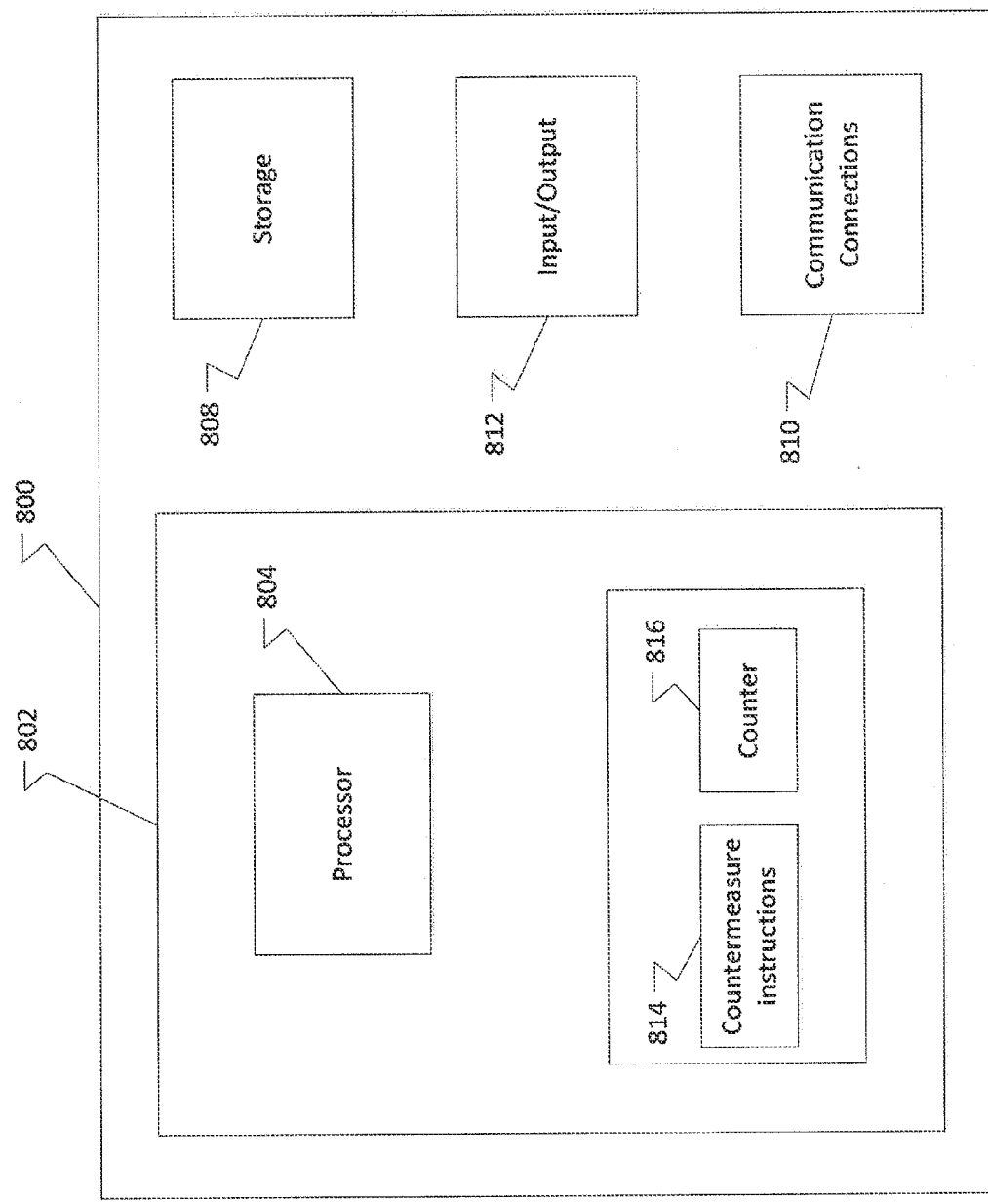
FIG. 8 an embodiment of a computing environment for implementing the various embodiments described herein.

With reference to FIG. 8, an embodiment of a computing environment for implementing the various embodiments described herein includes a computer system, such as computer system 800. Any and all components of the described embodiments (such as the DVR, the content storage sever, a laptop, mobile device, personal computer, etc.) may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 800 comprises at least one processing unit or processor 804 and system memory 806. The most basic configuration of the computer system 800 is illustrated in FIG. 8 by dashed line 802. In some embodiments, one or more components of the described system are loaded into system memory 806 and executed by the processing unit 804 from system memory 806. Depending on the exact configuration and type of computer system 800, system memory 806 may be volatile (such as RAM), non-volatile (such as ROM, flash memory, etc.), or some combination of the two.

Additionally, computer system 800 may also have additional features/functionality. For example, computer system 800 may include additional storage media 808, such as removable and/or non-removable storage, including, but not limited to, magnetic or optical disks or tape. In some embodiments, software or executable code and any data used for the described system is permanently stored in storage media 808. Storage media 808 includes volatile and non-volatile, removable and non-removable media implemented in any method or technology for storage of information such as computer readable instructions, data structures, program modules, or other data.

System memory 806 and storage media 808 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information and which is accessed by computer system 800 and processor 804. Any such computer storage media may be part of computer system 800. In some embodiments, system memory 806 and/or storage media 808 may store data used to perform the methods or form the system(s) disclosed herein. In other embodiments, system memory 806 may store countermeasure instructions 814 to perform the countermeasures described herein and counter and/or counter values 816.

Computer system 800 may also contain communications connection(s) 810 that allow the device to communicate with other devices. Communication connection(s) 810 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a mariner as to encode information or a message in the data signal. By way of example, and not limitation, communication media includes wired media such as a wired network or direct-wired connection, and wireless media such as an acoustic, RF, infrared, and other wireless media. In an embodiment, ECMs and EMMs and\or request to decrypt such may be transmitted over communications connection(s) 810.

In some embodiments, computer system 800 also includes input and output connections 812, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 812 are used to display the information as described herein. All these devices are well known in the art and need not be discussed at length here.

In some embodiments, the component described herein comprise such modules or instructions executable by computer system 800 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 800 is part of a network that stores data in remote storage media for use by the computer system 800.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the invention is not limited to those specific embodiments. One skilled in the art will recognize other embodiments or improvements that are within the scope and spirit of the present invention. Therefore, the specific structure, acts, or media are disclosed only as illustrative embodiments. The scope of the invention is defined by the following claims and any equivalents therein.

What is claimed is:

1. A computer-implemented method for performing a control word sharing countermeasure, the method comprising:
   establishing a counter;
   receiving a first encrypted control message, wherein the first encrypted control message corresponds to a first channel;
   receiving a second encrypted control message;
   determining whether the second encrypted control message corresponds to the first channel;
   when the second message does not correspond to the first channel, incrementing the counter by a first value;
   when the second control message corresponds to the first channel, decrementing the counter by a second value, wherein the second value is different from the first value;
   receiving an encrypted management message, wherein the encrypted management message contains a key for decrypting one or more encrypted control messages;
   determining whether a value of the counter is below a threshold value; and
   when the value of the counter is below the threshold value:

decrypting the encrypted management message to retrieve the key; and decrypting at least a third encrypted message using the key.

2. The computer-implemented method of claim 1, wherein discarding the encrypted management message comprises refusing access to the key.

3. The computer-implemented method of claim 1, wherein discarding the encrypted management message comprises providing a false key.

4. The computer-implemented method of claim 1, wherein the first and second encrypted control messages are Entitlement Control Messages (ECMs).

5. The computer-implemented method of claim 1, wherein the encrypted management message is an Entitlement Management Message (EMM).

6. The computer-implemented method of claim 1, wherein the method is performed by a smart card.

7. A method for performing a control word sharing countermeasure in a DVB environment, the method comprising:

establishing a counter, wherein the counter is established with a counter value having a preset value;

receiving a first entitlement control message (ECM) corresponding to a first channel;

in response to receiving the first ECM, incrementing the counter by a first value;

receiving a second ECM;

determining whether the second ECM corresponds to the first channel;

when the second ECM does not correspond to the first channel, incrementing the counter value by the first value;

when the second ECM is for the first channel, decrementing the counter value by a second value, wherein the second value is different from the first value;

receiving an entitlement management message (EMM);

determining if the counter value is below a threshold value; and when the counter value is below the threshold value, extracting a key from the EMM, wherein the key is capable of decrypting future ECMs.

8. The method of claim 7, further comprising:

if the counter value is not below the threshold value, providing a false key, wherein the false is not capable of decrypting future ECMs.

9. The method of claim 7, wherein the method is performed by a set-top-box.

10. The method of claim 7, wherein the method is performed by a smart card.

11. The method of claim 7, wherein extracting the key from the EMM comprises decrypting the EMM.

12. A system for performing a control word sharing countermeasure in a DVB environment, the system comprising:

a smart card; and a memory in electrical communication with the smart card, wherein the memory comprises executable instructions that, when executed by the smart card, perform a method comprising:

establishing a counter, wherein the counter is established with a counter value having a preset value;

receiving a first entitlement control message (ECM) corresponding to a first channel;

in response to receiving the first ECM, incrementing the counter value by a first value;

receiving a second ECM;

determining whether the second ECM corresponds to the first channel;

when the second ECM does not correspond to the first channel, incrementing the counter value by the first value;

when the second ECM corresponds to the first channel, decrementing the counter value by a second value, wherein the first and the second values are different;

receiving an entitlement management message (EMM);

determining if the counter value is below a threshold value;

when the counter value is below the threshold value, decrypting the EMM to extract a transmission key, wherein the transmission key is capable of decrypting future ECMs; and when the counter value is above the threshold value, discarding the EMM.

13. The system of claim 12, wherein discarding the EMM further comprises providing a false key, wherein the false key is not capable of decrypting future ECMs.

14. The system of claim 12, wherein discarding the EMM comprises refusing access to the key.

15. The computer-implemented method of claim 1, establishing the counter further comprises setting the counter to a default value.

16. The computer-implemented method of claim 15, wherein the default value is defined by a conditional access system.

17. The method of claim 7, wherein establishing the counter further comprises setting the counter to a default valued defined by a head-end.

18. The computer-implemented method of claim 1, wherein retrieving the key comprises storing the key in a conditional access system and using the key to decrypt future ECMs.

* * * * *